Sept. 14, 1926.
W. I. STAAF
1,599,849
FORE WHEEL BRAKE ATTACHMENT FOR AUTOMOBILES
Filed Oct. 29, 1923
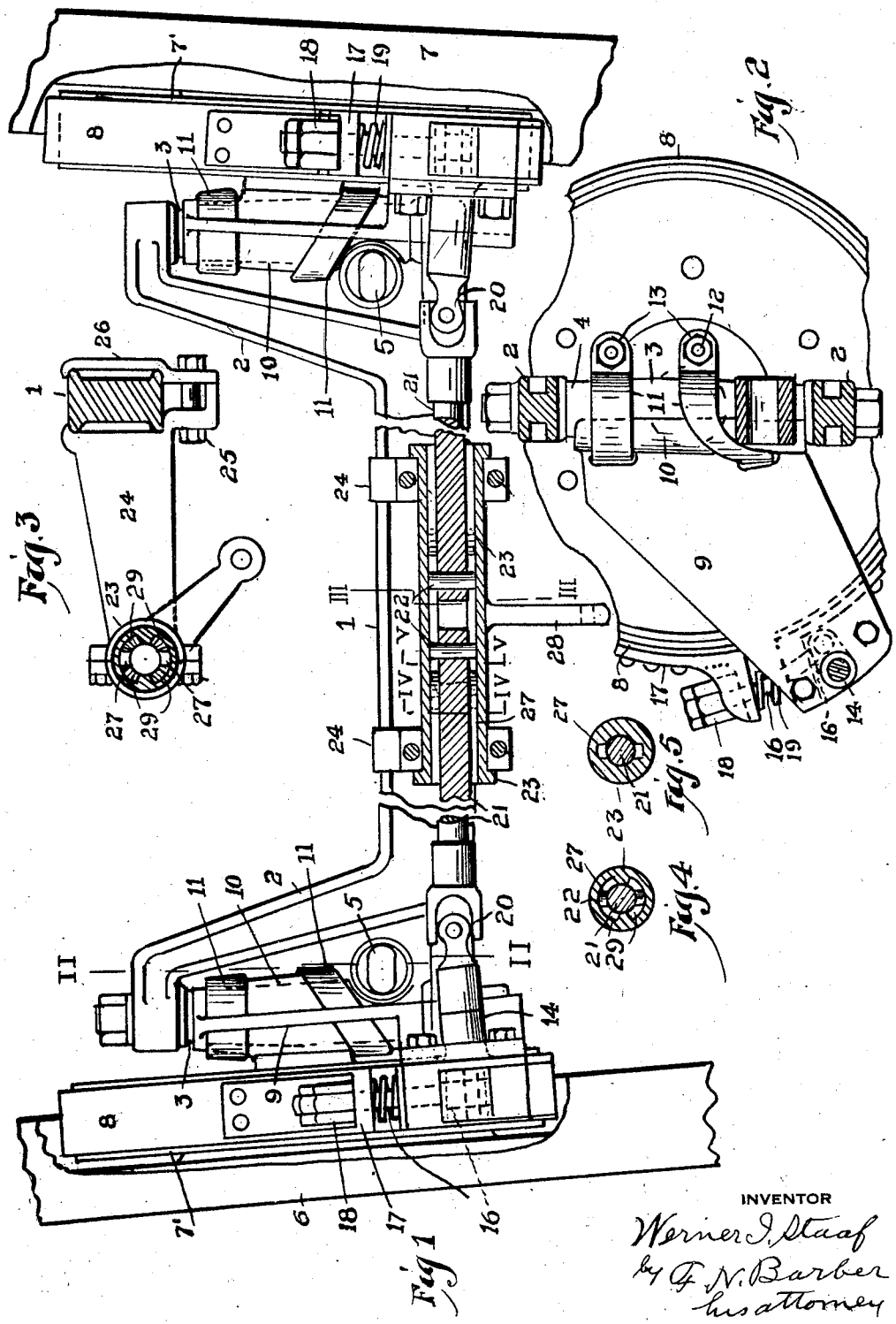
INVENTOR
Werner I. Staaf
by G. N. Barber
his attorney Patented Sept. 14, 1926.

1,599,849

UNITED STATES PATENT OFFICE.

WERNER I. STAAF, OF PITTSBURGH, PENNSYLVANIA, ASSIGNOR, BY DIRECT AND MESNE ASSIGNMENTS, TO SAMUEL STERN, OF UNIONTOWN, PENNSYLVANIA.

FORE-WHEEL BRAKE ATTACHMENT FOR AUTOMOBILES.

Application filed October 29, 1923. Serial No. 671,363.

My invention relates to fore-wheel brake attachments for automobiles.

The principal object of this invention is to provide an attachment which may be used with automobiles for the purpose of applying brakes to both fore wheels except while the automobiles are operating on curves, at which times the brakes are applied to the inner wheels only. My invention relates more specifically to the details by which my attachment is connected to an automobile as well as by which it performs its functions.

Referring to the accompanying drawing, Fig. 1 is an elevation showing my invention applied to the front axle and wheels of an automobile, parts being omitted and broken away; Fig. 2, a vertical section on the line II—II of Fig. 1; Fig. 3, a section on the line III—III of Fig. 1, parts in the distance being omitted; Fig. 4, a section on the line IV—IV of Fig. 1; and Fig. 5, a section on the line V—V of Fig. 1.

On the drawing, 1 designates the front axle of an automobile, the axle being shown as an I-beam having at its ends the usual pairs of forks 2, between the members of each of which pairs the knuckle 3 is pivoted in the usual manner. Each knuckle has the vertical spindle 4 to which is secured the operating member 5 and the wheel axle (not shown) on which a fore wheel 6 or 7 rotates. The apparatus so far described is old and in common use.

As the mechanism for each wheel is the same, I will describe that associated with the wheel 6 only. To the fore wheel 6 I secure a brake-drum 7' of common construction, each drum being nearly surrounded by a brake-band 8, one end of which is secured to the arm 9 of the bracket 10. This bracket embraces a portion of the spindle 4 and carries two clamping bands or members 11 which extend beyond the spindle 4 and on opposite sides thereof. The free ends of the members 11 are provided with bolts 12 on which nuts 13 are screwed to clamp the bracket 10 securely to the spindle of the knuckle.

The bracket has a bearing for an oscillatory brake-applying rod or shaft 14, having an arm 15 to which one end of the link 16 is pivoted. The other end of the link extends through the bracket 17 secured to the remaining end of the brake-band 8. A nut 18 is screwed on the link and against the upper side of the bracket 17, so that when the shaft 14 is rotated in the proper direction the bracket 17 will be drawn toward the arm 9 and cause the brake-band to grip its brake-drum 7'. A spring 19 on the link serves to release the brake-band when the braking action on the link is released by the operator of the automobile, preferably through the instrumentality of the usual foot pedal (not shown). The rod or shaft 14 is connected by a universal joint 20 to the shaft 21 extending along the axle 1 and toward the center of its length. The inner ends of the shaft 21 has a cross pin 22. The ends of the shafts 21 extend into the horizontal rotary sleeve 23 which has bearings on the brackets 24 attached to the central part of the axle 1 by the bolts 25. The bracket 24 has one face fitting the side of the axle. The opposite side of the axle has the clamping members 26 also having each a face fitting the axle. The bolts 25 draw the brackets 24 and the members 26 tightly against the opposite sides of the axle. The sleeve has a pair of longitudinal guide-ways 27 for the ends of the pins 22, and is rotated by the arm 28 to be attached to the usual brake-pedal or lever (not shown).

When the arm 28 is operated to rotate the sleeve 23, the brake-bands are both applied to their brake-drums when the wheels are at right angles with the axle 1 or nearly so. When the wheels are turned at an angle to the axis, as when turning a street corner, the shafts 21 slide in the sleeve 23, the one connected to the wheel on the outside of the curve being pulled outwardly until its cross-pin 22 leaves the guides 27, as shown in dotted lines, so that, if the sleeve is then rotated to apply the fore brakes, only the brake for the inner wheel will be applied, the brake for the outer wheel not being applied as the shaft 21 connected thereto can not be rotated by the sleeve. The ends of the guides 27 are provided with divergent inclines 29 which direct the pin back into the guides 27 when the wheels are again turned to guide the automobile straight ahead.

I claim—

1. In a fore-wheel braking mechanism, a brake for each fore wheel, a separate rotary shaft for applying each brake, a rotary operating sleeve for the shafts, and means whereby the operating sleeve is made inoperative with respect to one of the shafts when the automobile is changing its direction of travel.

2. In a fore-wheel braking mechanism, a brake for each fore wheel, a separate rotary shaft for applying each brake, a rotary operating sleeve for the shafts, and means whereby the operating sleeve is made inoperative with respect to one of the shafts when the automobile is changing its direction of travel, the shafts having cross-pins slidable in a longitudinal slot in the sleeve, and one of the pins riding out of its slot during such change of direction.

3. In a fore-wheel braking mechanism, a brake for each fore wheel, a separate rotary shaft for applying each brake, a rotary operating sleeve for the shafts, and means whereby the operating sleeve is made inoperative with respect to one of the shafts when the automobile is changing its direction of travel, the shafts having cross-pins slidable in a longitudinal slot in the sleeve, and one of the pins riding out of its slot during such change of direction, in combination with means for guiding the said one of the pins back into its slot when the travel of the automobile becomes substantially straight.

4. In a fore-wheel braking mechanism for automobiles, a brake for each fore-wheel, a shaft for operating each brake, a longitudinally-slotted rotary sleeve enclosing a portion of each shaft, a cross-pin carried by each shaft and riding in the slot, and means for rotating the sleeve, the pins being so located in the rods and the slot being of such length that, when the automobile is changing its direction of travel, one of the pins rides out of the slot.

In testimony whereof, I hereunto affix my signature this 26th day of October, 1923.

WERNER I. STAAF.